US012521300B1

(12) United States Patent
Xu

(10) Patent No.: US 12,521,300 B1
(45) Date of Patent: Jan. 13, 2026

(54) SUCTION MASSAGE STRUCTURE AND MASSAGER

(71) Applicant: Jiao Xu, Shenzhen (CN)

(72) Inventor: Jiao Xu, Shenzhen (CN)

(73) Assignee: Jiao Xu, Guangdong (CN)

( * ) Notice: Subject to any disclaimer, the term of this patent is extended or adjusted under 35 U.S.C. 154(b) by 0 days.

(21) Appl. No.: 19/178,854

(22) Filed: Apr. 14, 2025

(30) Foreign Application Priority Data

Nov. 8, 2024 (CN) ......................... 202411603878.4
Mar. 26, 2025 (CN) ......................... 202510377675.6

(51) Int. Cl.
*A61H 19/00* (2006.01)
*A61H 7/00* (2006.01)
*A61H 9/00* (2006.01)

(52) U.S. Cl.
CPC ........... *A61H 9/0057* (2013.01); *A61H 7/004* (2013.01); *A61H 7/008* (2013.01); *A61H 2201/1246* (2013.01); *A61H 2201/14* (2013.01); *A61H 2201/1669* (2013.01); *A61H 2201/5056* (2013.01)

(58) Field of Classification Search
CPC .... A61H 9/005; A61H 9/0057; A61H 9/0007; A61H 19/34
See application file for complete search history.

(56) References Cited

U.S. PATENT DOCUMENTS 939,822 A * 11/1909 Fey ........................ A61H 9/005 601/9
2,218,081 A * 10/1940 Brichieri-Colombi ...................... A61H 23/04 601/139
3,315,665 A * 4/1967 Macleod .............. A61N 1/0408 601/7
2017/0252261 A1* 9/2017 Khorassani Zadeh ...................... A61H 9/0057
2022/0110819 A1* 4/2022 Guo ...................... A61H 9/0057
2023/0022993 A1* 1/2023 Yu ......................... A61H 23/006
2023/0048210 A1* 2/2023 Chen ....................... A61H 7/001
(Continued)

FOREIGN PATENT DOCUMENTS

WO WO-2024127117 A1 * 6/2024 ........... A61H 9/0071

OTHER PUBLICATIONS

English translation of DE 202024106348 U1 (Year: 2024).*
English translation of Malfroot FR 2785177 A1 (Year: 2000).*

*Primary Examiner* — Justine R Yu
*Assistant Examiner* — Christopher E Miller
(74) *Attorney, Agent, or Firm* — Ming Jiang; OPENPTO US LLC

(57) ABSTRACT

Disclosed are a suction massage structure and a massager. The suction massage structure includes a first massage outlet, a second massage outlet, and an air control assembly, where the first massage outlet and the second massage outlet are configured to fit skin in a massage area; the air control assembly is communicated with both the first massage outlet and the second massage outlet; the air control assembly alternately blows or sucks air against the skin in the massage area to apply a positive or negative pressure; the air control assembly is configured to apply an opposite air pressure on the skin in the massage area through the second massage outlet when a positive or negative pressure is applied to the skin in the massage area through the first massage outlet; and the first massage outlet and the second massage outlet share at least part of their side walls.

17 Claims, 9 Drawing Sheets

(56) References Cited

U.S. PATENT DOCUMENTS

| | | | | |
|---|---|---|---|---|
| 2023/0320924 | A1* | 10/2023 | Zhou | A61H 9/0057 601/6 |
| 2024/0407967 | A1* | 12/2024 | Luo | A61H 9/005 |

* cited by examiner

SUCTION MASSAGE STRUCTURE AND MASSAGER

CROSS REFERENCE TO RELATED APPLICATIONS

The present application claims priorities of Chinese Patent Application No. 2024116038784, filed on Nov. 8, 2024, and Chinese Patent Application No. 2025103776756, filed on Mar. 26, 2025, the contents of which are hereby incorporated by reference in entirety.

TECHNICAL FIELD

The present disclosure relates to the technical field of massage devices, and particularly relates to a suction massage structure and a massager.

BACKGROUND

Massagers as common healthcare devices have been widely applied in people's daily lives. A massager is used to massage body parts of a user through various means, and enables to relax muscles, promote blood circulation, relieve fatigue, or the like. Among many types of massagers, suction-type massagers stand out due to their unique working principles and remarkable effects. The suction-type massagers, mainly by simulating actions of sucking, enable to stimulate body surfaces in a gentle yet powerful manner. Through the suction, the massager stimulates subcutaneous blood vessels and nerves, promotes blood circulation, and alleviates muscle tension, thereby achieving relaxation and soothing effects.

However, most suction-type massagers currently available on the market adopt physical massage modalities such as single-port contact, suction, light touch, vibration, and the like. Relatively simple massage modalities, poor massage effects, and insufficient stimulation sensations, result in relatively monotonous and poor user experience.

SUMMARY

In view of the above problems, an objective of the present disclosure is to provide a suction massage structure that enhances the massage effect and optimizes user experience, so as to solve the above problems.

The present disclosure is achieved by means of the following technical solution:

In a first aspect, the present disclosure provides a suction massage structure, and the suction massage structure includes a first massage outlet, a second massage outlet, and an air control assembly, where the first massage outlet and the second massage outlet are configured to fit skin in a massage area; the air control assembly is communicated with both the first massage outlet and the second massage outlet; the air control assembly alternately blows or sucks air against the skin in the massage area through the first massage outlet and the second massage outlet to apply a positive or negative pressure; the air control assembly is configured to apply an opposite air pressure on the skin in the massage area through the second massage outlet when a positive or negative pressure is applied to the skin in the massage area through the first massage outlet; and the first massage outlet and the second massage outlet share at least part of their side walls.

According to the technical solutions in the examples of the present disclosure, the air control assembly alternately applies a barometric variation field of positive or negative pressure to the skin in the massage area through the first massage outlet and the second massage outlet, and the first massage outlet and the second massage outlet alternately perform suction stimulation and compression stimulation to the skin in the massage area; and on the premise that the first massage outlet is arranged adjacent to the second massage outlet, the air control assembly is configured to apply an opposite barometric variation field to the skin in the massage area through the second massage outlet when a barometric variation field of positive or negative is applied to the skin in the massage area through the first massage outlet, that is, skin of the user near the skin subjected to suction stimulation (or compression stimulation) receives compression stimulation (or suction stimulation), such that an effect of alternating suction and compression is formed, the area subjected to suction stimulation or compression stimulation is switched alternately, and overall wave-like undulations occur across the massage area, which enables the massage area of the user to receive varied stimulation and enhances the massage effect and user experience.

In some examples, the first massage outlets and the second massage outlets are sleeved in an alternating manner from inside to outside.

According to the technical solutions in the examples of the present disclosure, the first massage outlets and the second massage outlets are sequentially sleeved from inside to outside. Under the premise that the first massage outlet is arranged adjacent to the second massage outlet, directions of airflow inside the first massage outlet and the second massage outlet adjacent to each other are opposite. When the skin in the massage area protrudes into the first massage outlet under the action of internal negative pressure from the first massage outlet (or sinks upward under the action of internal positive pressure from the first massage outlet), positive pressure from the second massage outlet adjacent thereto pushes the skin in the massage area to sink upward (the negative pressure from the second massage outlet adjacent thereto pushes the skin in the massage area to protrude into inside of the second massage outlet in a way of adsorbing), which amplifies a wave-like undulation degree of the massage area directly opposite to the first massage outlet and the second massage outlet that are adjacent to each other, increases a deformation magnitude of the massage area, and enhances the massage effect and user experience.

In some examples, an area of a barometric variation field applied to the skin in the massage area by the first massage outlet and the second massage outlet gradually increases from inside to outside.

According to the technical solutions in the examples of the present disclosure, each time when the air control assembly sucks or blows air into a space enclosed by the first massage outlet, the second massage outlet and the skin in the massage area, a same amount of air is sucked or blown into. Under this premise, when the space enclosed by the first massage outlet, the second massage outlet and the skin in the massage area is larger, an impact on internal pressure is reduced when sucking or blowing air each time. The area of a barometric variation field applied to the skin in the massage area by the first massage outlet and the second massage outlet is proportional to a size of the space enclosed by the first massage outlet, the second massage outlet and the skin in the massage area, and the area of a barometric variation field applied to the skin in the massage area by the first massage outlet and the second massage outlet gradually increases from inside to outside. An area of a barometric variation field applied to the skin in the massage area by the first massage outlet or the second massage outlet located on an inner side is significantly smaller than an area of a barometric variation field applied to the skin in the massage area by the first massage outlet or the second massage outlet located on an outer side, such that a repeated suction force applied to the massage area by the first massage outlet or the second massage outlet located on the inner side is significantly greater than a repeated suction force applied to the massage area by the first massage outlet or the second massage outlet located on the outer side, and intensities of stimulation received by the massage area from the first massage outlet and the second massage outlet are significantly different. Additionally, a massage force applied to the massage area by the first massage outlet and the second massage outlet gradually increases from outside to inside, such that the first massage outlet and the second massage outlet focus on stimulating a central area of the massage area, and the user easily aligns a target area of massage with an area of a massager with a stronger massage effect when using the massager with the suction massage structure provided by the present disclosure.

In some examples, the first massage outlet and the second massage outlet are arranged coaxially.

According to the technical solutions in the examples of the present disclosure, sleeved arrangement of the first massage outlets and the second massage outlets in an alternating manner from inside to outside induces wave-like undulations in the massage area. When the first massage outlet and the second massage outlet are not coaxially arranged, adjacent protruding parts of the wave-like massage area maybe overlap, and discomfort or even tissue damage occurs to skin in the overlapped parts, due to forces from various directions, including an excessive force and chaotic force distribution. In order to solve this problem, the first massage outlet and the second massage outlet are arranged coaxially, such that the wave-like undulations formed in the massage area due to a pushing action of the first massage outlet and the second massage outlet ripple outward around the innermost first massage outlet or the innermost second massage outlet, thereby avoiding the risk that adjacent protruding parts of the wave-like massage area maybe overlap, and enhancing safety and comfort of use.

In some examples, a diameter of the first massage outlet or the second massage outlet gradually decreases from an end thereof fitted with the skin in the massage area to an end thereof communicated with the air control assembly.

According to the technical solutions in the examples of the present disclosure, the diameter of the first massage outlet or the second massage outlet gradually decreases from the end thereof fitted with the skin in the massage area to the end thereof communicated with the air control assembly, such that in the first massage outlets and the second massage outlets sleeved alternately from inside to outside, the other first massage outlet and/or the other second massage outlet than the innermost massage outlet the skin in the massage area suck air toward a center of the massage area in an inclined manner, and suction effects of the first massage outlet and the second massage outlet converge inward. On the one hand, the first massage outlet and the second massage outlet stimulate the massage area towards the center thereof; and on the other hand, undulations of the massage area under the action of the first massage outlet and the second massage outlet converge towards the center of the massage area, and some skins near the center thereof press against each other to achieve a kneading and rubbing effect, which further enhances stimulation of the massage area and optimizes the user experience.

In some examples, flexibility of the first massage outlet and the second massage outlet decreases from inside to outside sequentially.

According to the technical solutions in the examples of the present disclosure, the first massage outlets and the second massage outlets are sleeved alternately from inside to outside. Taking the first massage outlet and the second massage outlet adjacent to each other as an example, an edge of the first massage outlet or the second massage outlet located on the inner side is comparatively more deformable than an edge of the first massage outlet or the second massage outlet located on the outer side. When the first massage outlet or the second massage outlet located on the inner side has an inner positive pressure and the first massage outlet or the second massage outlet located on the outer side has an inner negative pressure, the massage area is sucked into the first massage outlet or the second massage outlet located on the outer side, and the edge of the first massage outlet or the second massage outlet located on the inner side deforms outward due to the inner negative pressure from the first massage outlet or the second massage outlet located on the outer side, and then is tightly fitted with the massage area sucked into the first massage outlet or the second massage outlet located on the outer side, thereby preventing communication between the first massage outlet or the second massage outlet located on the inner side and the first massage outlet or the second massage outlet located on the outer side. When the first massage outlet or the second massage outlet located on the inner side has an inner negative pressure and the first massage outlet or the second massage outlet located on the outer side has an inner positive pressure, the massage area is sucked into the first massage outlet or the second massage outlet located on the inner side, and the first massage outlet or the second massage outlet located on the inner side deforms inward due to the inner negative pressure therefrom, and then is tightly fitted with the massage area sucked into the first massage outlet or the second massage outlet located on the inner side, thereby preventing communication between the first massage outlet or the second massage outlet located on the inner side and the first massage outlet or the second massage outlet located on the outer side.

In some examples, the number of the first massage outlets is at least one, the number of the second massage outlets is at least one, and the first massage outlet and the second massage outlet are circumferentially arrayed.

According to the technical solutions in the examples of the present disclosure, the first massage outlet and the second massage outlet are circumferentially arrayed, such that the first massage outlet and the second massage outlet stimulate the massage area in a more uniform manner, which enables the user to have a soothing experience of uniform massage on relatively flat areas of body surface.

In some examples, a direction of an opening where the first massage outlet is communicated with the air control assembly is parallel to a direction of an opening of the first massage outlet; and a direction of an opening where the second massage outlet is communicated with the air control assembly is parallel to a direction of an opening of the second massage outlet.

According to the technical solutions in the examples of the present disclosure, directions of openings of the first massage outlet and the second massage outlet are both parallel to directions of openings where they are communicated with the air control assembly, such that airflow entering or exiting the first massage outlet and the second massage outlet is in direct contact with the skin in the massage area, which enhances the sensation that the massage area is pushed or adsorbed by the airflow, and optimizes the user experience.

In some examples, the air control assembly includes an air pump housing and a pushing member, where the pushing member is in sliding fit with an inner wall of the air pump housing; the pushing member divides an internal space of the air pump housing into two variable chambers; the variable chambers are communicated with the first massage outlet or the second massage outlet; and the pushing member is configured to move inside the air pump housing to alternately increase and decrease volumes of the two variable chambers.

According to the technical solutions in the examples of the present disclosure, the air control assembly includes an air pump housing and a pushing member, the pushing member is in sliding fit with an inner wall of the air pump housing, and the pushing member is tightly fitted with the inner wall of the air pump housing to prevent air circulation between the two variable chambers; the two variable chambers are connected to the first massage outlet and the second massage outlet, the pushing member is configured to move inside the air pump housing to alternately increase and decrease volumes of the two variable chambers, and when the pushing member moves, a volume of one of the two variable chambers increases while a volume of the other one decreases simultaneously, and an internal pressure of the variable chamber with an increasing volume decreases, such that air inside a space enclosed by the skin in the massage area and the first massage outlet or the second massage outlet that is communicated with the variable chamber is sucked into the variable chamber, and the first massage outlet or the second massage outlet applies a barometric variation field of negative pressure to the skin in the massage area; and an internal pressure of the variable chambers with a decreasing volume increases, such that air inside the variable chamber is blown into a space enclosed by the skin in the massage area and the first massage outlet or the second massage outlet that is communicated with the variable chamber, such that the first massage outlet or the second massage outlet applies a barometric variation field of positive pressure to the skin in the massage area, and the first massage outlet and the second massage outlet suck and compress the skin in the massage area in a stable and synchronized manner, with a simple structure and stable effects.

In some examples, the two variable chambers are communicated with the first massage outlet and the second massage outlet through flexible hoses.

According to the technical solutions in the examples of the present disclosure, the two variable chambers are communicated with the massage outlets through flexible hoses, the hoses expand or contract to reduce pressure variations inside a space enclosed by the massage outlet and the massage area, which mitigates the risk of pain and injury of the user caused by an excessive force of pushing or sucking the massage area when overpressure or underpressure occurs inside the space enclosed by the massage outlet and the massage area.

In some examples, the air control assembly further includes an eccentric member and a drive member; the drive member is configured to drive the eccentric member to rotate; the pushing member is internally provided with a through hole for the eccentric member to penetrate through; and when the eccentric member rotates, the pushing member is driven to move between ports where the two variable chambers are communicated with the first massage outlet or the second massage outlet in a reciprocating manner.

According to the technical solutions in the examples of the present disclosure, when the eccentric member rotates, the pushing member is driven to move between ports where the two variable chambers are communicated with the first massage outlet or the second massage outlet in a reciprocating manner. The eccentric member and the pushing member are matched in a simple manner, with a stable effect, which enables reliable use over a long period. Additionally, the eccentric wheel is compact, which reduces an overall volume of the suction massage structure provided in the present disclosure, and makes it easier for the user to hold and operate.

In some examples, a piston head is arranged at either of the two ends of the pushing member that face the two variable chambers; and the piston heads are fitted with the inner wall of the air pump housing.

According to the technical solutions in the examples of the present disclosure, a piston head is arranged at either of the two ends of the pushing member, and the piston heads are tightly fitted with the inner wall of the air pump housing, such that a dual dynamic sealing interface is formed. When the eccentric member drives the pushing member to move in a reciprocating manner, the piston heads maintain constant pressure of contact with the inner wall of the air pump housing, which effectively isolates air in the two variable chambers (preventing air from the variable chamber of positive pressure from leaking into the variable chamber of negative pressure or an external environment), thereby ensuring precision of alternating pressure control. The two piston heads are symmetrically distributed at two axial ends of the pushing member, which forms a “dual-point guiding” structure that constrains a motion trajectory of the pushing member in the air pump housing and prevents tilting or jamming of the pushing member caused by unilateral force bearing when the eccentric member rotates, thereby ensuring smooth reciprocating motion.

In some examples, the internal space of the air pump housing is cylindrical; and the piston heads are fitted with an inner circumferential face of the air pump housing.

According to the technical solutions in the examples of the present disclosure, the inner circumferential face of the cylindrical air pump housing and the piston heads form a 360° continuous contact face, which eliminates the risk of local sealing failure caused by angular or irregular structures (e.g., air leakage at corners of a rectangular housing). The tight fit between the piston heads and the inner wall of the air pump housing ensures complete isolation of the variable chamber of positive pressure/the variable chamber of negative pressure, prevents air channeling during pressure alternation, and ensures precision of suction-release actions. A cylindrical symmetrical structure ensures uniform force distribution during reciprocating motion of the piston heads, and prevents sealing clearance enlargement caused by eccentric wear, thereby maintaining stable airtightness even after long-term use. The inner wall of the cylindrical air pump housing provides a natural coaxial guiding track for the piston heads, and the eccentric member drives the pushing member to slide smoothly and linearly, which reduces additional friction caused by lateral deflection (such as a “wall scuffing” phenomenon in irregular cavities) and also load and energy consumption of the drive member. The uniformly distributed contact stress between the piston heads and the inner wall of the air pump housing prevents local stress concentration, and avoids crack formation or plastic deformation of the piston heads or the inner wall of the air pump housing caused by repeated friction, thereby extending a service life of the air control assembly.

In some examples, an outer wall of the pushing member is fitted with at least two opposing inner wall faces of the air pump housing.

According to the technical solutions in the examples of the present disclosure, the outer wall of the pushing member is fitted with two opposing inner wall faces of the air pump housing, which forms a “track-type” constraint, restricts the pushing member to linearly move only in a designated direction, and prevents circumferential deflection or self-rotation of the pushing member during rotation of the eccentric member, thereby ensuring precise transmission of air pressure control actions. A face of fitting between the pushing member and the air pump housing absorbs radial component forces generated by eccentric drive, which prevents tilting or jamming of the pushing member caused by unilateral force bearing, enhances stability of the reciprocating motion, and reduces vibration and noise.

In a second aspect, the present disclosure provides a massager, and the massager includes the suction massage structure mentioned in the first aspect and an outer shell, where the air control assembly is arranged inside the outer shell, and the first massage outlet and the second massage outlet are arranged outside the outer shell; an outer surface of the outer shell includes recessed grooves for accommodating the first massage outlet and the second massage outlet; and one end of either of the first massage outlet and the second massage outlet that is fitted with the skin in the massage area is flush with the outer surface of the outer shell.

According to the technical solutions in the examples of the present disclosure, the outer surface of the outer shell includes recessed grooves for accommodating the first massage outlet and the second massage outlet; and one end of either of the first massage outlet and the second massage outlet that is fitted with the skin in the massage area is flush with the outer surface of the outer shell, which, on the one hand, reduces the risk of damage to the first massage outlet and the second massage outlet protruding from the outer shell, and on the other hand, limits the first massage outlet and the second massage outlet through the outer shell, and restricts excessive compression of the massage area by the first massage outlet and the second massage outlet.

In some examples, the outer shell includes an in-vivo end and an in-vitro end; the first massage outlet and the second massage outlet are arranged on a side wall of the in-vivo end and/or at the in-vitro end.

According to the technical solutions in the examples of the present disclosure, the first massage outlet and the second massage outlet are arranged on a side wall of the in-vivo end, and the in-vivo end is inserted into the user’s body to massage a skin area of the user that fits the side wall of the in-vivo end; and alternatively, the first massage outlet and the second massage outlet are arranged at the in-vitro end to massage an area of the user’s body surface.

In some examples, an inner shell is further arranged inside the outer shell; the inner shell is harder than the outer shell; and the inner shell is fitted with the outer shell and the inner shell supports the outer shell.

According to the technical solutions in the examples of the present disclosure, the inner shell is harder than the outer shell, such that the outer shell is supported by the harder inner shell when deforming and fitting with the user’s skin, to maintain an overall shape of the massager provided in the present disclosure, which enhances overall stability of the massager and optimizes user experience.

In some examples, the inner shell is formed by splicing a first sub-shell and a second sub-shell; and the first sub-shell and the second sub-shell are detachably connected.

According to the technical solutions in the examples of the present disclosure, the split-type inner shell allows for step-by-step assembly of the outer shell and the inner shell (e.g., the air control assembly is first secured to the sub-shells of the inner shell, and then overall splicing is performed), which reduces the difficulty of mounting components inside complicated cavities. A single sub-shell damaged (e.g., cracked or deformed) is individually removed and replaced, thereby eliminating the need to discard the entire inner shell due to localized faults, and significantly reducing maintenance costs.

In some examples, the first massage outlet and the second massage outlet are communicated with the air control assembly through hoses; the inner shell is provided with through holes for the hoses; and part of the outer shell extends into the through hole and is fitted with an end of the hose.

According to the technical solutions in the examples of the present disclosure, the outer shell extends into the through hole of the inner shell and is tightly fitted with an end of the hose, and a mechanically compressed sealing interface is formed, which prevents air leakage at a joint under high pressure or negative pressure conditions, thereby ensuring the efficiency of pressure transfer between the air control assembly and the massage outlet. The end of the hose is secured through cooperation of the outer shell and the through hole, and a dual-constraint design (limitation through the through hole of the inner shell+compression through the outer shell) effectively resists high-frequency vibrations of the massager during operation, and prevents functional failure caused by hose connection loosening.

In some examples, a power supply and a charging system are further arranged inside the outer shell; the power supply is electrically connected to the air control assembly, and the power supply is also electrically connected to the charging system; and a charging port of the charging system extends to the outer surface of the outer shell.

According to the technical solutions in the examples of the present disclosure, the built-in power supply (such as a lithium battery) enables the massager provided in the present disclosure to operate without need of an external power supply, and the user is allowed to move the massager freely when using (applicable to scenarios such as homes, vehicles, or travel), thereby expanding the application scope. The charging port extends to a surface of the outer shell, and direct plug-in charging (through a Type-C interface) is supported, without need to disassemble the outer shell or use specialized tools, thereby enhancing user convenience.

Additional aspects and advantages of the present disclosure will be set forth partially in the following description, which will become obvious in the following description, or may be learned by practice of the present disclosure.

BRIEF DESCRIPTION OF THE DRAWINGS

To describe the technical solution in the examples of the present disclosure more clearly, the accompanying drawings required for describing the examples are briefly described below. It is to be understood that the following accompanying drawings show merely some examples of the present disclosure, and therefore it is not to be construed as a limitation to the scope. Those of ordinary skill in the art can also derive other accompanying drawings from these accompanying drawings without making inventive efforts.

Figure 1:
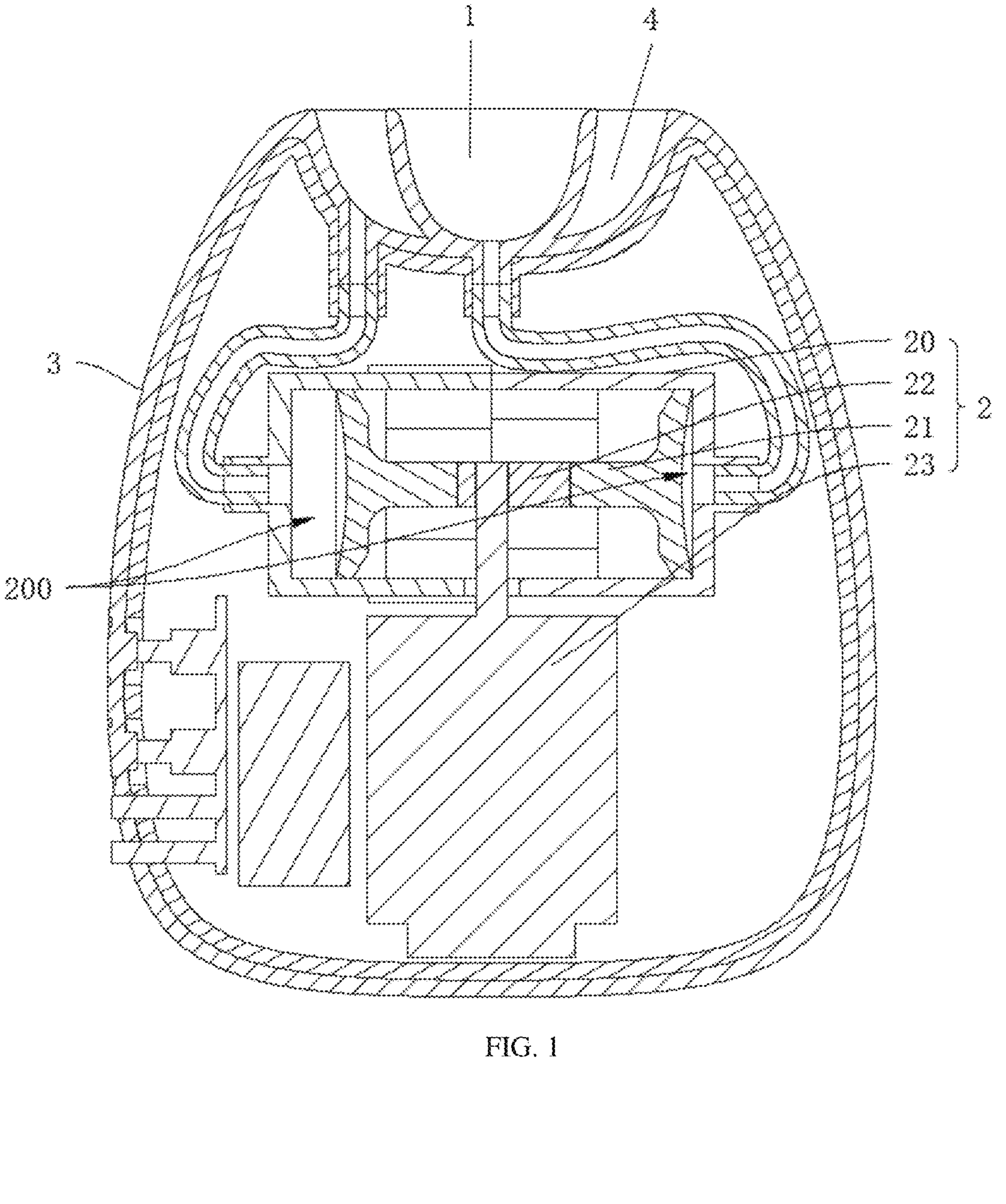
FIG. 1 is a sectional view of FIG. 9 in an A-A direction.
Figure 2:
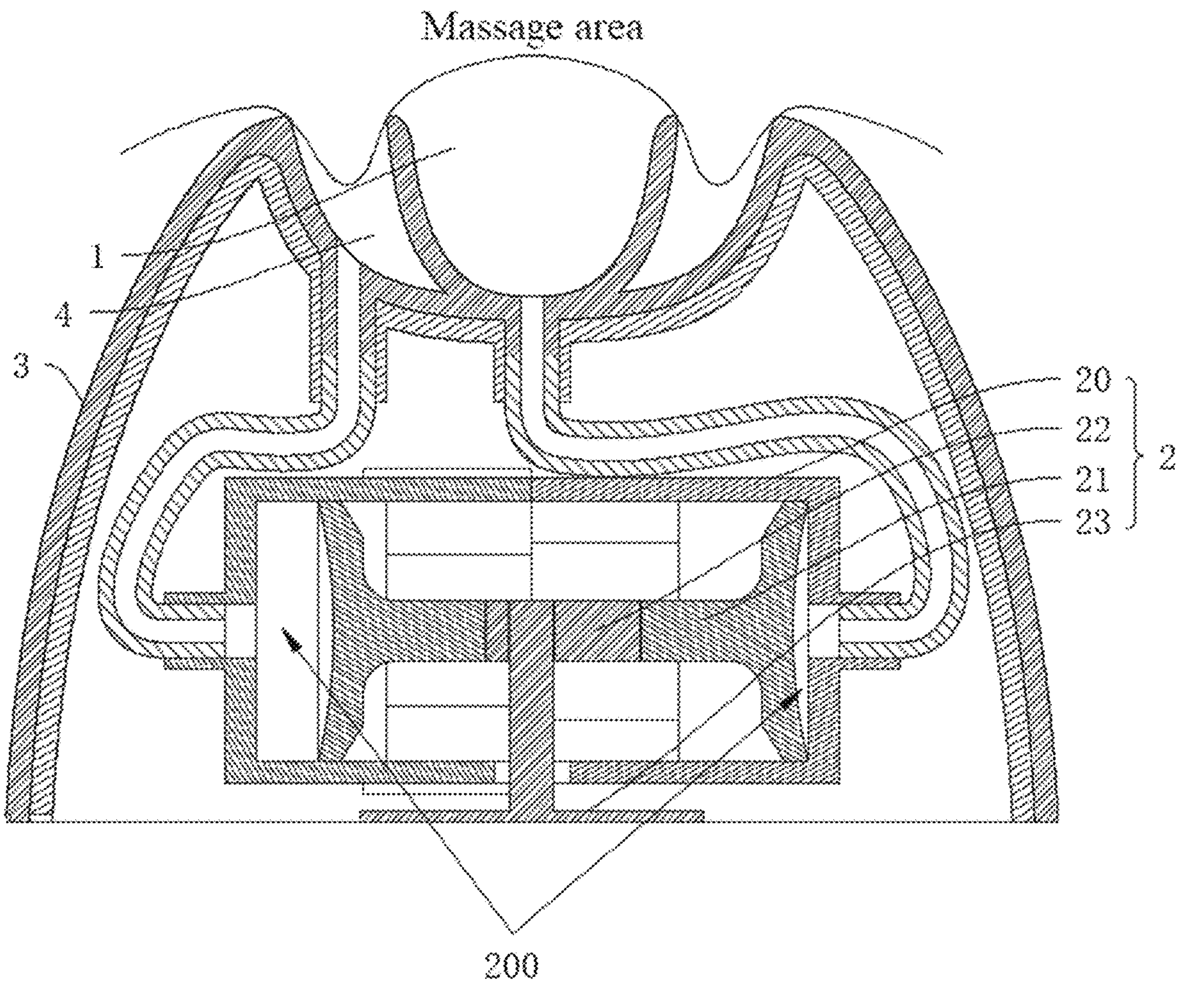
FIG. 2 is a partial sectional view of FIG. 9 in an A-A direction.

Reference numerals: 1—first massage outlet; 2—air control assembly; 20—air pump housing; 200—variable chamber; 21—pushing member; 22—eccentric member; 23—drive member; 3—outer shell; 30—in-vivo end; 31—in-vitro end; and 4—second massage outlet.

DETAILED DESCRIPTIONS OF THE EMBODIMENTS

In order to make the objectives, technical solutions and advantages of the examples of the present disclosure clearer, the technical solutions in the examples of the present disclosure will be clearly and completely described below in combination with the accompanying drawings in the examples of the present disclosure. Apparently, the examples described are merely some rather than all of the examples of the present disclosure. Based on the examples of the present disclosure, all other examples acquired by those of ordinary skill in the art without making creative efforts fall within the scope of protection of the present disclosure.

Unless defined otherwise, all technical and scientific terms used herein have the same meanings as commonly understood by those skilled in the art to which the present disclosure belongs. The terms used in the specification of the present disclosure are for the purpose of describing specific examples merely and are not intended to limit the present disclosure. The terms "including" and "having", and any variations thereof in the specification, the claims and the above accompanying drawings are intended to cover non-exclusive inclusion. The terms "first", "second" and the like in the specification and the claims or the above accompanying drawings are used to distinguish different objects and are not intended to indicate a specific order or hierarchical relationship.

When the term "example" is referred to herein, it means that specific features, structures or characteristics described in combination with the example are included in at least one example of the present disclosure. When this phrase occurs at various positions in the specification, it neither necessarily refers to the same embodiment, nor refers to an independent or alternative embodiment mutually exclusive to other embodiments. Those skilled in the art understand both explicitly and implicitly that the examples described herein can be combined with other examples.

In the description of the present disclosure, it is to be noted that, unless otherwise explicitly specified and defined, the terms "mounting", "connected", "connecting" and "attaching" are to be understood in a broad sense, for example, they may be a fixed connection, a detachable connection, or an integrated connection; and may be a direct connection, or an indirect connection via an intermediate medium, or communication inside two elements. For those of ordinary skill in the art, the specific meanings of the above terms in the present disclosure may be understood according to specific circumstances.

The term "and/or" in the present disclosure, which is merely an association relation describing an associated object, means that there maybe exist three relations, for example, A and/or B maybe represent three situations: A exists alone, A and B exist at the same time, and B exists alone. In addition, the character "/" mentioned in the present disclosure generally indicates that the associated objects are in an "or" relationship.

The term "a plurality of" used in the present disclosure refers to two or more (including two), and similarly, "a plurality of groups" refers to two or more groups (including two groups), and "a plurality of sheets" refers to two or more sheets (including two sheets).

According to some examples of the present disclosure, optionally, as illustrated in FIGS. 1-7, the present disclosure provides a suction massage structure, and the suction massage structure includes a first massage outlet 1, a second massage outlet 4, and an air control assembly 2, where the first massage outlet 1 and the second massage outlet 4 are configured to fit skin in a massage area; the air control assembly 2 is communicated with both the first massage outlet 1 and the second massage outlet 4; the air control assembly 2 alternately blows or sucks air against the skin in the massage area through the first massage outlet 1 and the second massage outlet 4 to apply a positive or negative pressure; the air control assembly 2 is configured to apply an opposite air pressure on the skin in the massage area through the second massage outlet 4 when a positive or negative pressure is applied to the skin in the massage area through the first massage outlet 1; and the first massage outlet 1 and the second massage outlet 4 share at least part of their side walls.

The massage outlet (i.e., the first massage outlet 1 or the second massage outlet 4 mentioned herein) is optionally made from a skin-friendly flexible material, such as rubber or resin. On the one hand, when a compressive force between the massage outlet and the skin in the massage area is relatively large, the massage outlet deforms to reduce the pressure applied to the skin in the massage area and prevent pain and even injury of the user caused by excessive compression of the massage area by the massage outlet. On the other hand, an opening of the massage outlet (i.e., an end of the massage outlet that is fitted with the skin in the massage area) deforms based on a shape of the massage area to fit the skin in the massage area, and a barometric variation field applied to the skin in the massage area by the air control assembly 2 through the massage outlet acts on a corresponding area in a relatively direct manner, which minimizes the risk of a diminished effect of the barometric variation field (i.e., suction and compression effects caused by pressure variations) generated when positive or negative pressure is alternately applied to the skin in the massage area through the massage outlet due to air leakage.

The barometric variation field mentioned in the present disclosure refers to a completely enclosed or nearly enclosed space formed when the massage outlet is in contact with the skin in the massage area, where airflow acts on the skin to produce a stimulation effect by blowing and suction during massage. In a barometric variation field of positive pressure, the air control assembly 2 blows air into the space formed between the massage outlet and the skin in the massage area to increase an internal air pressure, and internal air pushes the skin in the massage area to achieve a compressive stimulation effect. In a barometric variation field of negative pressure, the air control assembly 2 sucks air into the space formed between the massage outlet and the skin in the massage area to decrease an internal air pressure, and internal air sucks the skin in the massage area to achieve a suction stimulation effect.

Either of the massage outlets is optionally of a concave cavity structure, such that part of the massage area protrudes into the massage outlet under the action of negative pressure in the massage outlet, which achieves an effect of massage by means of suction.

Either of the massage outlets is not specifically limited in shape, which is elliptical, circular, rectangular, polygonal, or the like. However, in practical applications, because human skin is delicate and rectangular and polygonal shapes have right-angled edges, right-angled edges thereof, in case of contact with a body part, exert pressure on skin in a massage area, thereby easily leading to skin injury. Therefore, the massage outlet is typically elliptical or circular, but it does not mean that the massage outlet is only elliptical or circular, and the massage outlet is alternatively arranged to be rectangular, polygonal or the like when right-angled edges of a rectangular or polygonal shape are rounded.

Adjacency mentioned in the present disclosure refers to at least point adjacency (an edge of the first massage outlet 1 and an edge of the second massage outlet 4 share at least one point), that is, the first massage outlet 1 and the second massage outlet 4 share at least part of their side walls.

The air control assembly 2 alternately applies a barometric variation field of positive or negative pressure to the skin in the massage area through the first massage outlet 1 and the second massage outlet 4, and the first massage outlet 1 and the second massage outlet 4 alternately perform suction stimulation and compression stimulation to the skin in the massage area; and on the premise that the first massage outlet 1 is arranged adjacent to the second massage outlet 4, the air control assembly 2 is configured to apply an opposite barometric variation field to the skin in the massage area through the second massage outlet 4 when a barometric variation field of positive or negative is applied to the skin in the massage area through the first massage outlet 1, that is, skin of the user near the skin subjected to suction stimulation (or compression stimulation) receives compression stimulation (or suction stimulation), such that an effect of alternating suction and compression is formed, the area subjected to suction stimulation or compression stimulation is switched alternately, and overall wave-like undulations occur across the massage area, which enables the massage area of the user to receive varied stimulation and enhances the massage effect and user experience.

According to some examples of the present disclosure, as illustrated in FIGS. 1-5 and 8, the first massage outlets 1 and the second massage outlets 4 are sleeved in an alternating manner from inside to outside.

The number of the first massage outlets 1 is at least one, and the number of the second massage outlets 4 is at least one.

When the numbers of the first massage outlet 1 and the second massage outlet 4 are both one, the first massage outlet 1 or the second massage outlet 4 is sleeved on an outer side of the other massage outlet.

In the first massage outlets 1 and the second massage outlets 4 sleeved alternately and sequentially, except for the first massage outlet 1 or the second massage outlet 4 that is arranged to be innermost, parts of the other first massage outlet 1 and/or the other second massage outlet 4 that stimulate the skin in the massage area are ring-shaped, which may be shaped like an irregular ring or a regular circular ring.

In a height direction of the massage outlets, an opening where the first massage outlet 1 and the second massage outlet 4 are communicated with the air control assembly 2 is lower than a lowest point of parts of the massage area that protrude into the first massage outlet 1 and the second massage outlet 4 under the action of internal negative pressure from the first massage outlet 1 and the second massage outlet 4, which prevents the user's skin from being directly sucked into the opening where the first massage outlet 1 and the second massage outlet 4 are communicated with the air control assembly 2, and reduces the risk of discomfort and even injury of the user caused by an excessively concentrated acting force applied when a relatively small opening where the first massage outlet 1 and the second massage outlet 4 are communicated with the air control assembly 2 acts on a small skin area of the massage area.

The first massage outlets 1 and the second massage outlets 4 are sequentially sleeved from inside to outside. On the premise that the first massage outlet 1 is arranged adjacent to the second massage outlet 4, directions of airflow inside the first massage outlet 1 and the second massage outlet 4 adjacent to each other are opposite. When the skin in the massage area protrudes into the first massage outlet 1 under the action of internal negative pressure from the first massage outlet 1 (or sinks upward under the action of internal positive pressure from the first massage outlet 1), positive pressure from the second massage outlet 4 adjacent thereto pushes the skin in the massage area to sink upward (the negative pressure from the second massage outlet 4 adjacent thereto pushes the skin in the massage area to protrude into inside of the second massage outlet 4 in a way of adsorbing), which amplifies a wave-like undulation degree of the massage area directly opposite to the first massage outlet 1 and the second massage outlet 4 that are adjacent to each other, increases a deformation magnitude of the massage area, and enhances the massage effect and user experience.

According to some examples of the present disclosure, optionally, an area of a barometric variation field applied to the skin in the massage area by the first massage outlet 1 and the second massage outlet 4 gradually increases from inside to outside.

Each time when the air control assembly 2 sucks or blows air into a space enclosed by the first massage outlet 1, the second massage outlet 4 and the skin in the massage area, a same amount of air is sucked or blown into. Under this premise, when the space enclosed by the first massage outlet 1, the second massage outlet 4 and the skin in the massage area is larger, an impact on internal pressure is reduced when sucking or blowing air each time. The area of a barometric variation field applied to the skin in the massage area by the first massage outlet 1 and the second massage outlet 4 is proportional to a size of the space enclosed by the first massage outlet 1, the second massage outlet 4 and the skin in the massage area, and the area of a barometric variation field applied to the skin in the massage area by the first massage outlet 1 and the second massage outlet 4 gradually increases from inside to outside. An area of a barometric variation field applied to the skin in the massage area by the first massage outlet 1 or the second massage outlet 4 located on an inner side is significantly smaller than an area of a barometric variation field applied to the skin in the massage area by the first massage outlet 1 or the second massage outlet 4 located on an outer side among the first massage outlets 1 and the second massage outlets 4 sleeved alternately and sequentially, such that a repeated suction force applied to the massage area by the first massage outlet 1 or the second massage outlet 4 located on the inner side is significantly greater than a repeated suction force applied to the massage area by the first massage outlet 1 or the second massage outlet 4 located on the outer side, and intensities of stimulation received by the massage area from the first massage outlet 1 and the second massage outlet 4 are significantly different. Additionally, a massage force applied to the massage area by the first massage outlet 1 and the second massage outlet 4 gradually increases from outside to inside, such that the first massage outlet 1 and the second massage outlet 4 focus on stimulating a central area of the massage area, and the user easily aligns a target area of massage with an area of a massager with a stronger massage effect when using the massager with the suction massage structure provided by the present disclosure.

According to some examples of the present disclosure, optionally, as illustrated in FIGS. 1-5 and 8, the first massage outlet 1 and the second massage outlet 4 are arranged coaxially.

The term "arranged coaxially" mentioned herein specifically means: when the first massage outlet 1 and the second massage outlet 4 are circular or elliptical, the first massage outlet 1 and the second massage outlet 4 are arranged concentrically; and when the first massage outlet 1 and the second massage outlet 4 are rectangular or polygonal, the first massage outlet 1 and the second massage outlet 4 are arranged along a common central axis. By analogy, vertical lines of the first massage outlet 1 and the second massage outlet 4 at least partially coincide.

Sleeved arrangement of the first massage outlets 1 and the second massage outlets 4 in an alternating manner from inside to outside induces wave-like undulations in the massage area. When the first massage outlet 1 and the second massage outlet 4 are not coaxially arranged, adjacent protruding parts of the wave-like massage area maybe overlap, and discomfort or even tissue damage occurs to skin in the overlapped parts, due to forces from various directions, including an excessive force and chaotic force distribution. In order to solve this problem, the first massage outlet 1 and the second massage outlet 4 are arranged coaxially, such that the wave-like undulations formed in the massage area due to a pushing action of the first massage outlet 1 and the second massage outlet 4 ripple outward around the innermost first massage outlet 1 or the innermost second massage outlet 4, thereby avoiding the risk that adjacent protruding parts of the wave-like massage area maybe overlap, and enhancing safety and comfort of use.

According to some examples of the present disclosure, optionally, as illustrated in FIGS. 1-4 and 8, a diameter of the first massage outlet 1 or the second massage outlet 4 gradually decreases from an end thereof fitted with the skin in the massage area to an end thereof communicated with the air control assembly 2.

The term "top" mentioned in the present disclosure refers to the end of the first massage outlet 1 or the second massage outlet 4 fitted with the skin in the massage area, and the term "bottom" mentioned in the present disclosure refers to the end of the first massage outlet 1 or the second massage outlet 4 communicated with the air control assembly 2.

The diameter of the first massage outlet 1 or the second massage outlet 4 gradually decreases from the end thereof fitted with the skin in the massage area to the end thereof communicated with the air control assembly 2, such that in the first massage outlets 1 and the second massage outlets 4 sleeved alternately from inside to outside, the other first massage outlet 1 and/or the other second massage outlet 4 than the innermost massage outlet the skin in the massage area suck air toward a center of the massage area in an inclined manner, and suction effects of the first massage outlet 1 and the second massage outlet 4 converge inward. On the one hand, the first massage outlet 1 and the second massage outlet 4 stimulate the massage area towards the center thereof; and on the other hand, undulations of the massage area under the action of the first massage outlet 1 and the second massage outlet 4 converge towards the center of the massage area, and some skin near the center press against each other to achieve a kneading and rubbing effect, which further enhances stimulation of the massage area and optimizes the user experience.

According to some examples of the present disclosure, optionally, flexibility of the first massage outlet 1 and the second massage outlet 4 decreases from inside to outside sequentially.

The first massage outlets 1 and the second massage outlets 4 are sleeved alternately from inside to outside. Taking the first massage outlet 1 and the second massage outlet 4 adjacent to each other as an example, an edge of the first massage outlet 1 or the second massage outlet 4 located on the inner side is comparatively more deformable than an edge of the first massage outlet 1 or the second massage outlet 4 located on the outer side. When the first massage outlet 1 or the second massage outlet 4 located on the inner side has an inner positive pressure and the first massage outlet 1 or the second massage outlet 4 located on the outer side has an inner negative pressure, the massage area is sucked into the first massage outlet 1 or the second massage outlet 4 located on the outer side, and the edge of the first massage outlet 1 or the second massage outlet 4 located on the inner side deforms outward due to the inner negative pressure from the first massage outlet 1 or the second massage outlet 4 located on the outer side, and then is tightly fitted with the massage area sucked into the first massage outlet 1 or the second massage outlet 4 located on the outer side, thereby preventing communication between the first massage outlet 1 or the second massage outlet 4 located on the inner side and the first massage outlet 1 or the second massage outlet 4 located on the outer side. When the first massage outlet 1 or the second massage outlet 4 located on the inner side has an inner negative pressure and the first massage outlet 1 or the second massage outlet 4 located on the outer side has an inner positive pressure, the massage area is sucked into the first massage outlet 1 or the second massage outlet 4 located on the inner side, and the first massage outlet 1 or the second massage outlet 4 located on the inner side deforms inward due to the inner negative pressure therefrom, and then is tightly fitted with the massage area sucked into the first massage outlet 1 or the second massage outlet 4 located on the inner side, thereby preventing communication between the first massage outlet 1 or the second massage outlet 4 located on the inner side and the first massage outlet 1 or the second massage outlet 4 located on the outer side.

Figure 6:
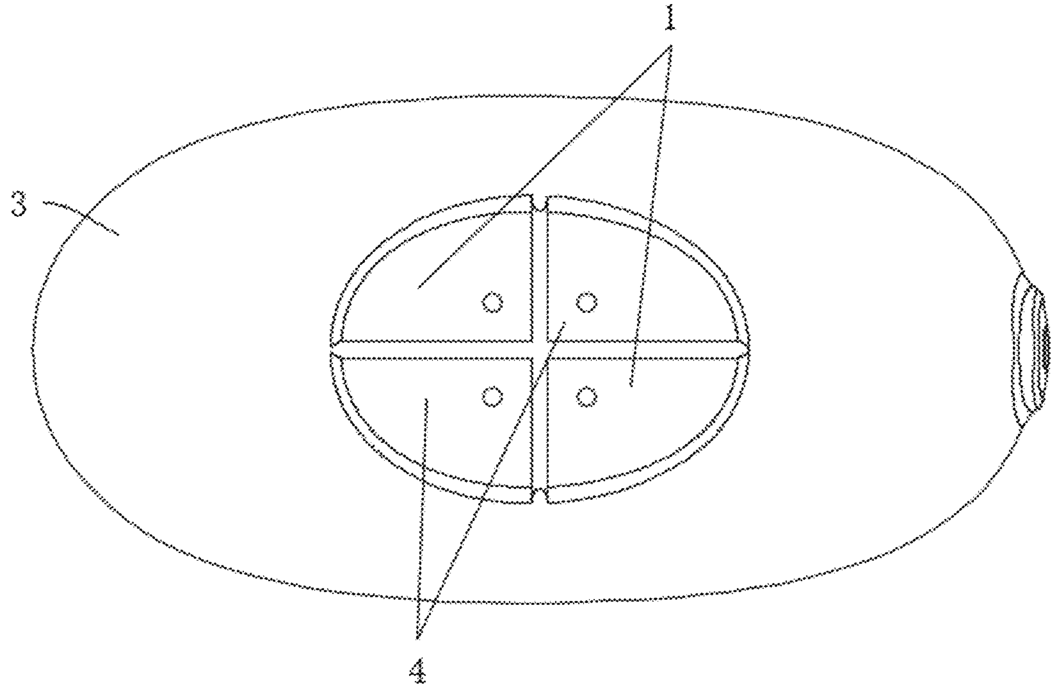
FIG. 6 is a schematic diagram of an external structure of a massager provided in some examples of the present disclosure.

According to some examples of the present disclosure, optionally, as illustrated in FIG. 6, the number of the first massage outlets 1 is at least one, the number of the second massage outlets 4 is at least one, and the first massage outlet 1 and the second massage outlet 4 are circumferentially arrayed.

The number of the first massage outlets 1 is alternatively two or more; and the number of the second massage outlets 4 is alternatively two or more.

The first massage outlet 1 and the second massage outlet 4 are circumferentially arrayed, such that the first massage outlet 1 and the second massage outlet 4 stimulate the massage area in a more uniform manner, which enables the user to have a soothing experience of uniform massage on relatively flat areas of body surface.

A communication port between the air control assembly 2 and the first massage outlet 1 or the second massage outlet 4 is controlled to turn on or off through a switch, and the user conveniently activates part or all of the massage outlets according to needs.

Figure 3:
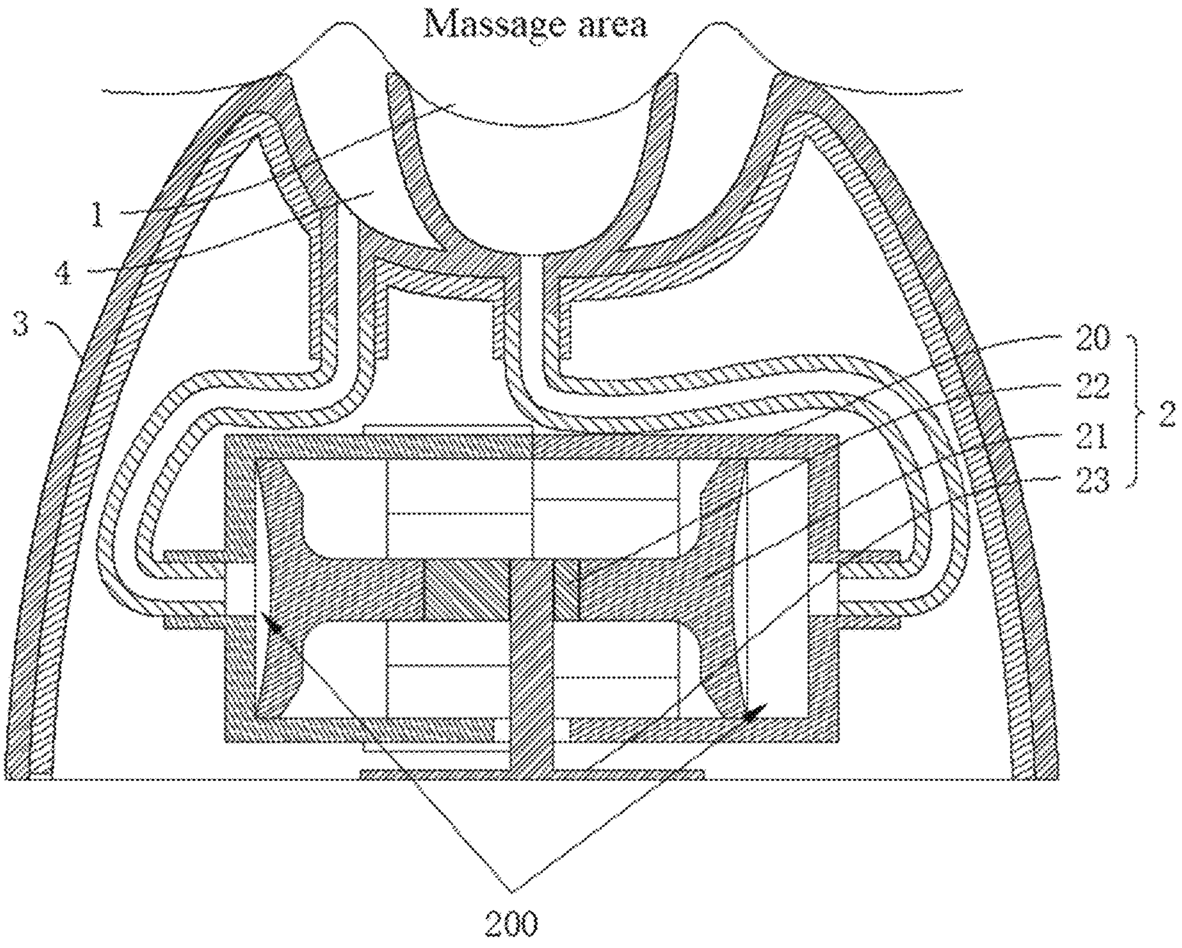
FIG. 3 is a partial sectional view of FIG. 9 in an A-A direction after movement of a pushing member.
Figure 4:
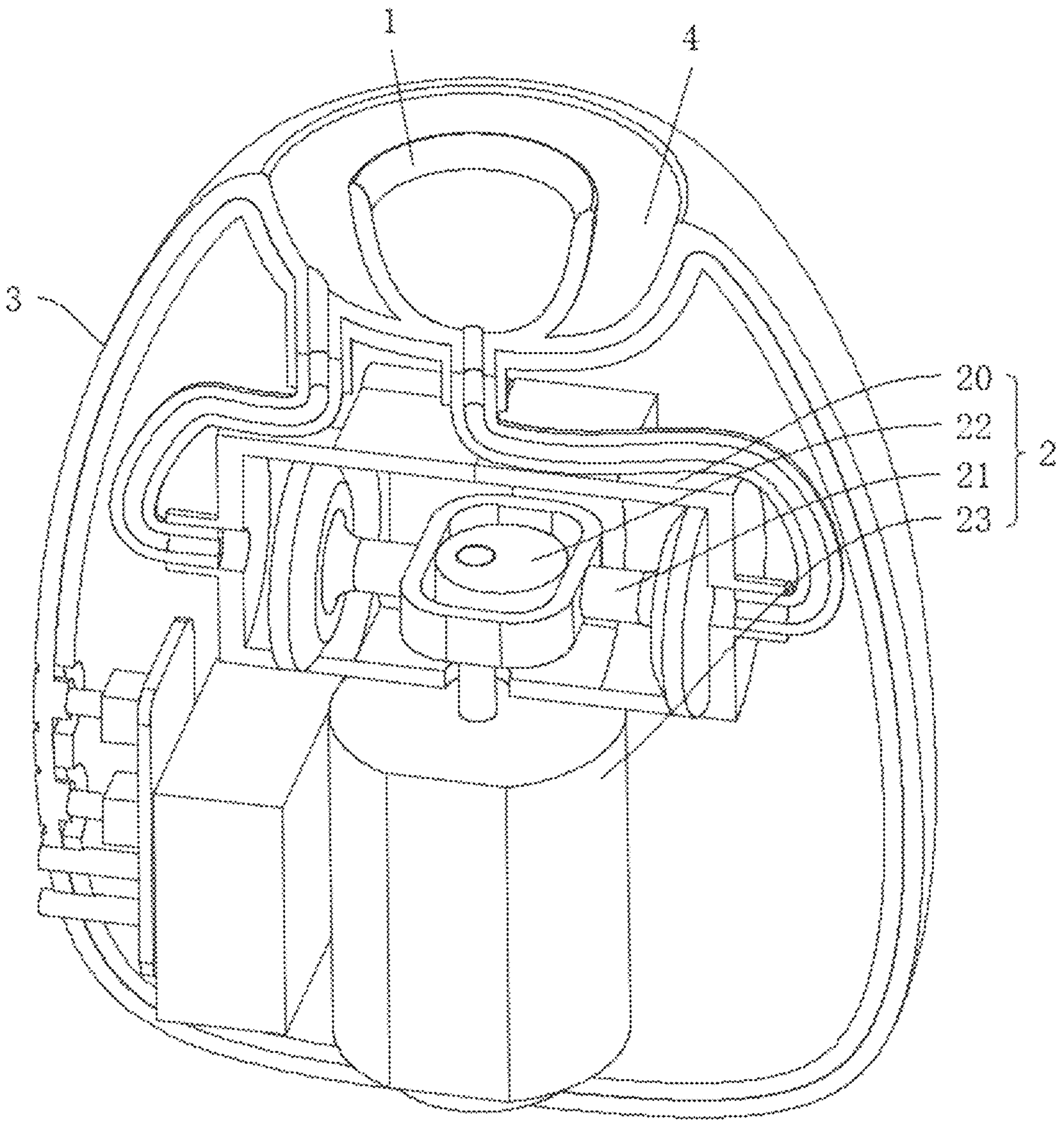
FIG. 4 is a schematic diagram of an internal structure of a massager provided in some examples of the present disclosure.
Figure 5:
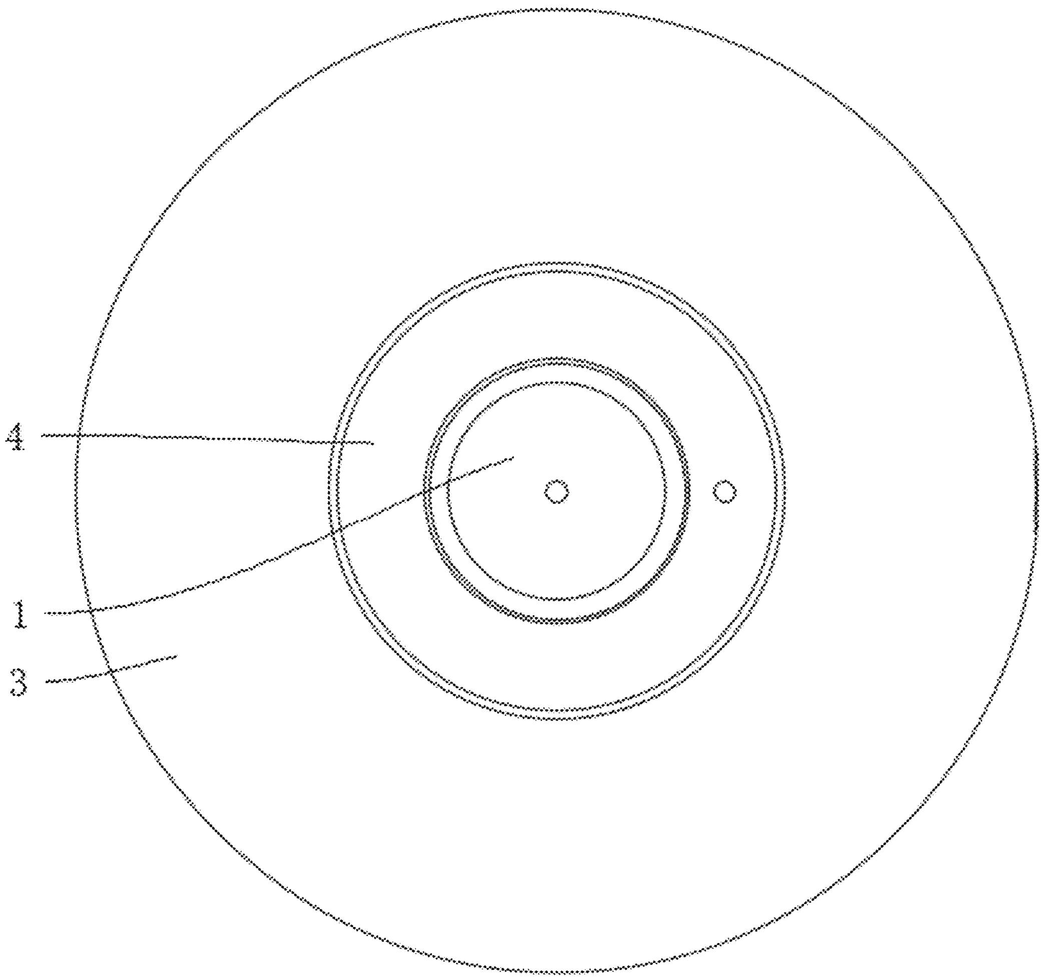
FIG. 5 is a top view of a massager provided in some examples of the present disclosure.

According to some examples of the present disclosure, optionally, as illustrated in FIGS. 3-5, a direction of an opening where the first massage outlet 1 is communicated with the air control assembly 2 is parallel to a direction of an opening of the first massage outlet 1; and a direction of an opening where the second massage outlet 4 is communicated with the air control assembly 2 is parallel to a direction of an opening of the second massage outlet 4.

Opening directions of the first massage outlet 1 and the second massage outlet 4 that share part of their side walls are optionally parallel to each other.

Directions of openings of the first massage outlet 1 and the second massage outlet 4 are both parallel to directions of openings where they are communicated with the air control assembly 2, such that airflow entering or exiting the first massage outlet 1 and the second massage outlet 4 is in direct contact with the skin in the massage area, which enhances the sensation that the massage area is pushed or adsorbed by the airflow, and optimizes the user experience.

According to some examples of the present disclosure, optionally, as illustrated in FIGS. 1-4 and 7, the air control assembly 2 includes an air pump housing 20 and a pushing member 21, where the pushing member 21 is in sliding fit with an inner wall of the air pump housing 20; the pushing member 21 divides an internal space of the air pump housing 20 into two variable chambers 200; the variable chambers 200 are communicated with the first massage outlet 1 or the second massage outlet 4; and the pushing member 21 is configured to move inside the air pump housing 20 to alternately increase and decrease volumes of the two variable chambers 200.

The air control assembly 2 includes an air pump housing 20 and a pushing member 21, the pushing member 21 is in sliding fit with an inner wall of the air pump housing 20, and the pushing member 21 is tightly fitted with the inner wall of the air pump housing 20 to prevent air circulation between the two variable chambers 200; the two variable chambers 200 are connected to the first massage outlet 1 and the second massage outlet 4, the pushing member 21 is configured to move inside the air pump housing 20 to alternately increase and decrease volumes of the two variable chambers 200, and when the pushing member 21 moves, a volume of one of the two variable chambers 200 increases while a volume of the other one decreases simultaneously, and an internal pressure of the variable chamber 200 with an increasing volume decreases, such that air inside a space enclosed by the skin in the massage area and the first massage outlet 1 or the second massage outlet 4 that is communicated with the variable chamber is sucked into the variable chamber, and the first massage outlet 1 or the second massage outlet 4 applies a barometric variation field of negative pressure to the skin in the massage area; and an internal pressure of the variable chambers 200 with a decreasing volume increases, such that air inside the variable chamber 200 is blown into a space enclosed by the skin in the massage area and the first massage outlet 1 or the second massage outlet 4 that is communicated with the variable chamber, such that the first massage outlet 1 or the second massage outlet 4 applies a barometric variation field of positive pressure to the skin in the massage area, and the first massage outlet 1 and the second massage outlet 4 suck and compress the skin in the massage area in a stable and synchronized manner, with a simple structure and stable effects.

According to some examples of the present disclosure, optionally, the two variable chambers 200 are communicated with the first massage outlet 1 and the second massage outlet 4 through flexible hoses.

Materials of the hoses include, but are not limited to, silicone, rubber, resin and the like.

The two variable chambers 200 are communicated with the first massage outlet 1 and the second massage outlet 4 through flexible hoses, and the hoses expand or contract to reduce pressure variations inside a space enclosed by the massage outlet and the massage area, which mitigates the risk of pain and injury of the user caused by an excessive force of pushing or sucking the massage area when overpressure or underpressure occurs inside the space enclosed by the massage outlet and the massage area.

According to some examples of the present disclosure, optionally, as illustrated in FIGS. 1-4 and 7, the air control assembly 2 further includes an eccentric member 22 and a drive member 23; the drive member 23 is configured to drive the eccentric member 22 to rotate; the pushing member 21 is internally provided with a through hole for the eccentric member 22 to penetrate through; and when the eccentric member 22 rotates, the pushing member 21 is driven to move between ports where the two variable chambers 200 are communicated with the first massage outlet 1 or the second massage outlet 4 in a reciprocating manner.

The air pump housing 20 is optionally provided with an opening for an output end of the drive member 23 to extend into, and the opening is located between two ends of the pushing member 21 that face the two variable chambers 200.

The eccentric member 22 is optionally an eccentric wheel.

When the eccentric member 22 rotates, the pushing member 21 is driven to move between ports where the two variable chambers 200 are communicated with the first massage outlet 1 or the second massage outlet 4 in a reciprocating manner. The eccentric member 22 and the pushing member 21 are matched in a simple manner, with a stable effect, which enables reliable use over a long period. Additionally, the eccentric wheel is compact, which reduces an overall volume of the suction massage structure provided in the present disclosure, and makes it easier for the user to hold and operate.

According to some examples of the present disclosure, optionally, as illustrated in FIGS. 3-6, a piston head is arranged at either of the two ends of the pushing member 21 that face the two variable chambers 200; and the piston heads are fitted with the inner wall of the air pump housing 20.

Sealing rings are optionally arranged along edges of the piston heads to enhance a sealing effect between the piston heads and the air pump housing 20.

A piston head is arranged at either of the two ends of the pushing member 21, and the piston heads are tightly fitted with the inner wall of the air pump housing 20, such that a dual dynamic sealing interface is formed. When the eccentric member 22 drives the pushing member 21 to move in a reciprocating manner, the piston heads maintain constant pressure of contact with the inner wall of the air pump housing, which effectively isolates air in the two variable chambers 200 (preventing air from the variable chamber of positive pressure from leaking into the variable chamber of negative pressure or an external environment), thereby ensuring precision of alternating pressure control. The piston heads are symmetrically distributed at two axial ends of the pushing member 21, which forms a "dual-point guiding" structure that constrains a motion trajectory of the pushing member 21 in the air pump housing 20 and prevents tilting or jamming of the pushing member 21 caused by unilateral force bearing when the eccentric member 22 rotates, thereby ensuring smooth reciprocating motion.

According to some examples of the present disclosure, optionally, as illustrated in FIG. 6, the internal space of the air pump housing 20 is cylindrical; and the piston heads are fitted with an inner circumferential face of the air pump housing 20.

The piston heads match an inner wall face of the air pump housing 20 in shape.

The inner circumferential face of the cylindrical air pump housing 20 and the piston heads form a 360° continuous contact face, which eliminates the risk of local sealing failure caused by angular or irregular structures (e.g., air leakage at corners of a rectangular housing). The tight fit between the piston heads and the inner wall of the air pump housing 20 ensures complete isolation of the variable chamber of positive pressure/the variable chamber of negative pressure, prevents air channeling during pressure alternation, and ensures precision of suction-release actions. A cylindrical symmetrical structure ensures uniform force distribution during reciprocating motion of the piston heads, and prevents sealing clearance enlargement caused by eccentric wear, thereby maintaining stable airtightness even after long-term use. The inner wall of the cylindrical air pump housing 20 provides a natural coaxial guiding track for the piston heads, and the eccentric member 22 drives the pushing member 21 to slide smoothly and linearly, which reduces additional friction caused by lateral deflection (such as a "wall scuffing" phenomenon in irregular cavities) and also load and energy consumption of the drive member 23. The uniformly distributed contact stress between the piston heads and the inner wall of the air pump housing 20 prevents local stress concentration, and avoids crack formation or plastic deformation of the piston heads or the inner wall of the air pump housing caused by repeated friction, thereby extending a service life of the air control assembly 2.

According to some examples of the present disclosure, optionally, an outer wall of the pushing member 21 is fitted with at least two opposing inner wall faces of the air pump housing 20.

When the internal space of the air pump housing 20 is cylindrical, the outer wall of the pushing member 21 is fitted with two radially opposing inner wall faces of the air pump housing 20.

The outer wall of the pushing member 21 is fitted with two opposing inner wall faces of the air pump housing 20, which forms a "track-type" constraint, restricts the pushing member 21 to linearly move only in a designated direction, and prevents circumferential deflection or self-rotation of the pushing member 21 during rotation of the eccentric member 22, thereby ensuring precise transmission of air pressure control actions. A face of fitting between the pushing member 21 and the air pump housing 20 absorbs radial component forces generated by eccentric drive, which prevents tilting or jamming of the pushing member 21 caused by unilateral force bearing, enhances stability of the reciprocating motion, and reduces vibration and noise.

According to some examples of the present disclosure, optionally, as illustrated in FIGS. 1-9, the present disclosure provides a massager, and the massager includes the above suction massage structure and an outer shell 3, where the air control assembly 2 is arranged inside the outer shell 3, and the first massage outlet 1 and the second massage outlet 4 are arranged outside the outer shell 3; an outer surface of the outer shell 3 includes recessed grooves for accommodating the first massage outlet 1 and the second massage outlet 4; and one end of either of the first massage outlet 1 and the second massage outlet 4 that is fitted with the skin in the massage area is flush with the outer surface of the outer shell 3.

The outer shell 3 is optionally a double-layer structure, an outer layer thereof is made of a skin-friendly flexible material, and an inner layer thereof is made of a material with certain structural stability.

The outer surface of the outer shell 3 includes recessed grooves for accommodating the first massage outlet 1 and the second massage outlet 4; and one end of either of the first massage outlet 1 and the second massage outlet 4 that is fitted with the skin in the massage area is flush with the outer surface of the outer shell 3, which, on the one hand, reduces the risk of damage to the first massage outlet 1 and the second massage outlet 4 protruding from the outer shell 3, and on the other hand, limits the first massage outlet 1 and the second massage outlet 4 through the outer shell 3, and restricts excessive compression of the massage area by the first massage outlet 1 and the second massage outlet 4.

Figure 7:
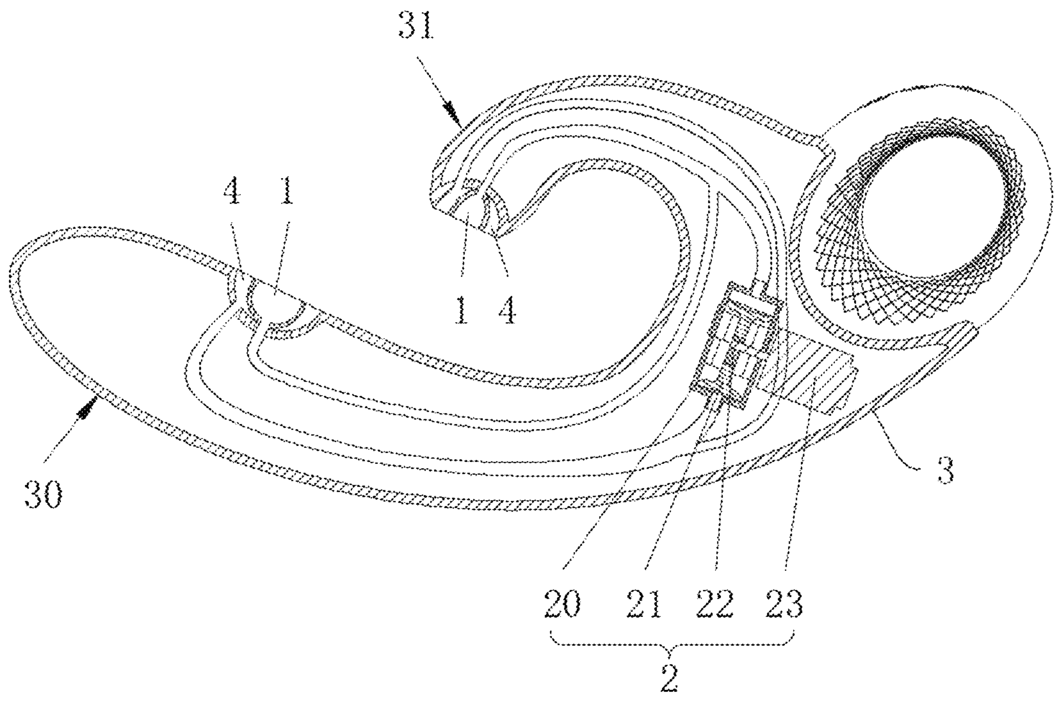
FIG. 7 is a schematic diagram of an external structure of a massager provided in some other examples of the present disclosure.
Figure 8:
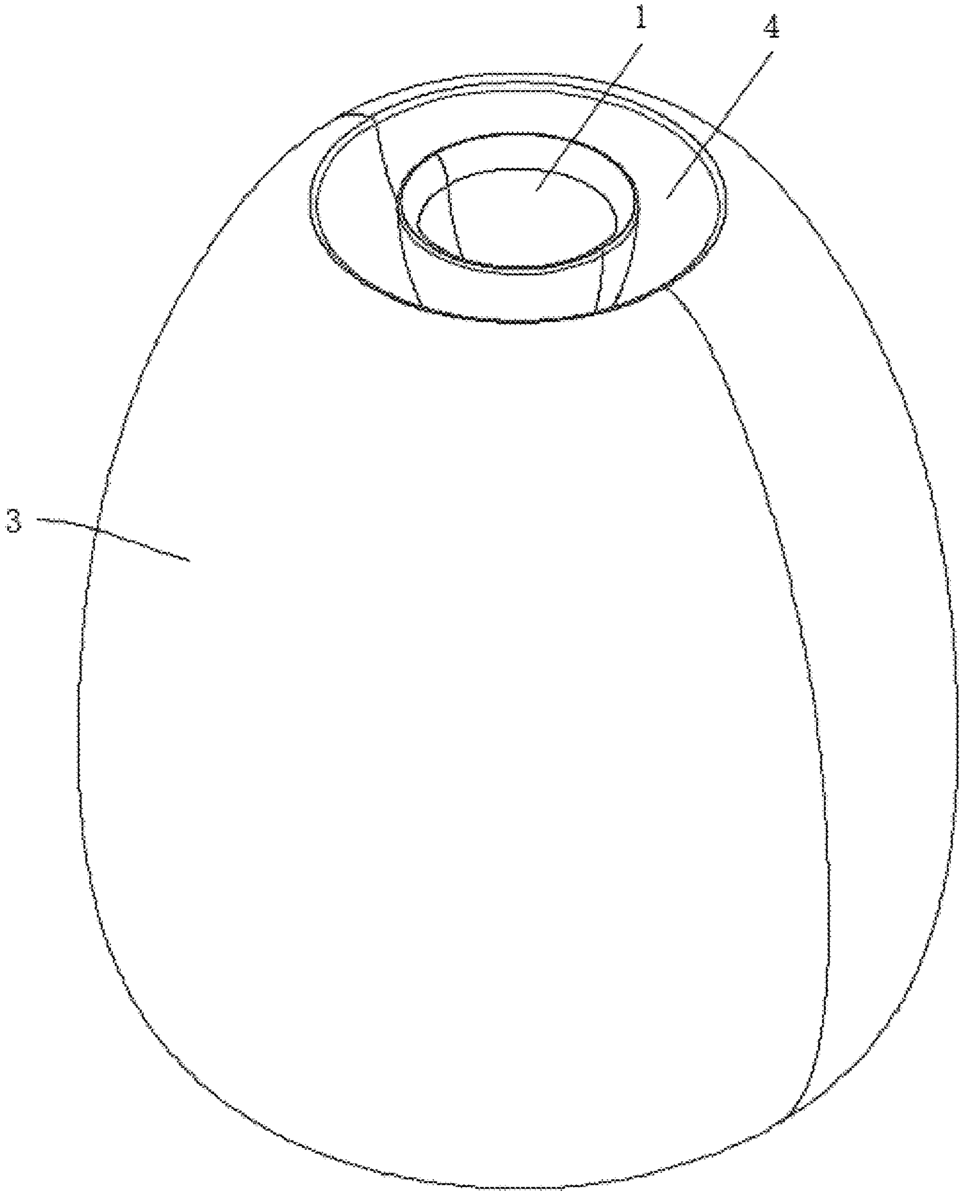
FIG. 8 is a schematic diagram of an external structure of a massager provided in further examples of the present disclosure.
Figure 9:
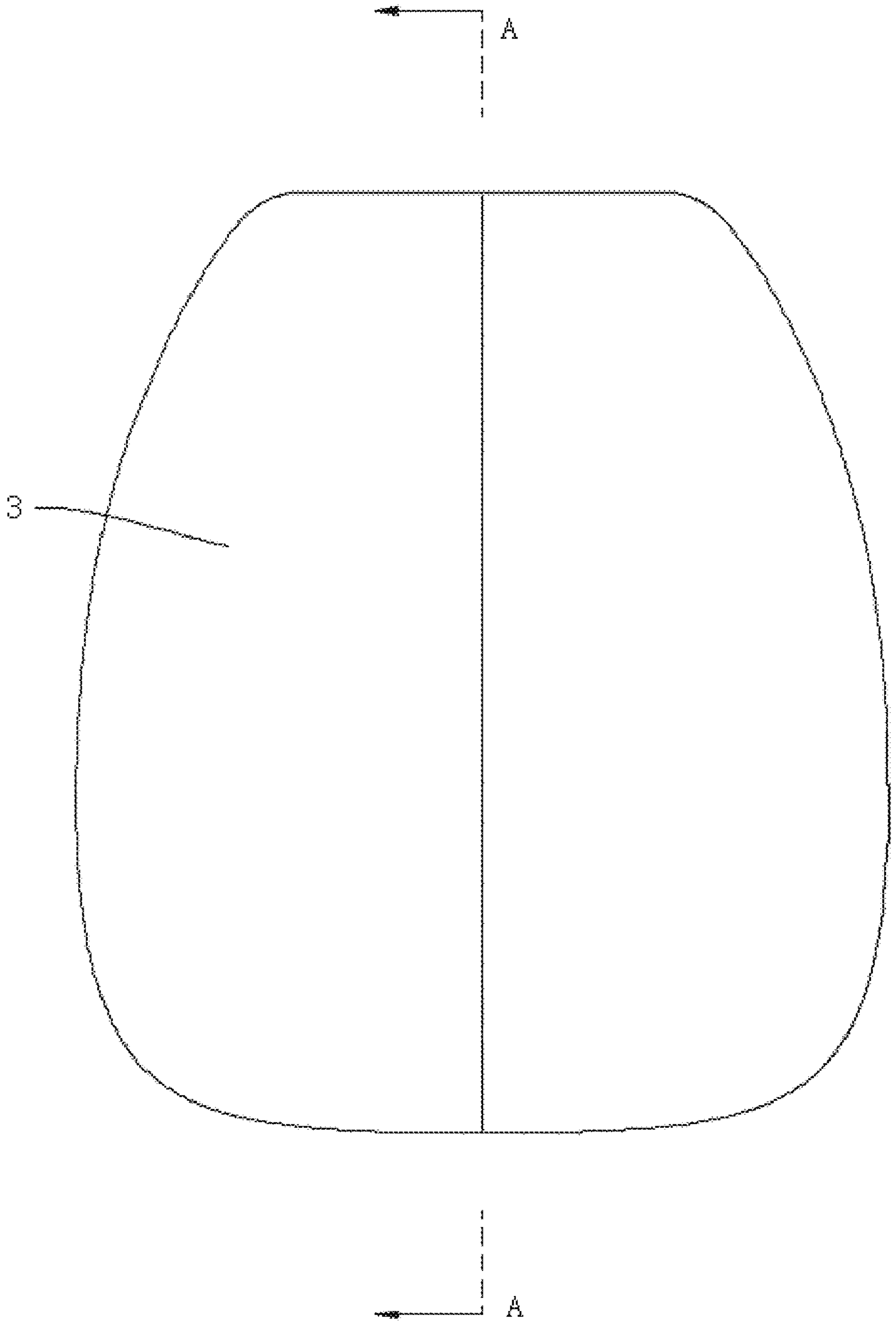
FIG. 9 is a side view of a massager provided in some examples of the present disclosure.

According to some examples of the present disclosure, optionally, as illustrated in FIG. 7, the outer shell 3 includes an in-vivo end 30 and an in-vitro end 31; the first massage outlet 1 and the second massage outlet 4 are arranged on a side wall of the in-vivo end 30; and alternatively, the first massage outlet 1 and the second massage outlet 4 are arranged at the in-vitro end 31.

The in-vivo end 30 is an end of the housing that is inserted into the user's body to massage a target location.

The in-vitro end 31 is an end of the outer shell 3 that is in contact with the user's body surface for massage.

A plurality of the in-vitro ends 31 are optionally arranged.

The first massage outlet 1 and the second massage outlet 4 are arranged on a side wall of the in-vivo end 30, and the in-vivo end 30 is inserted into the user's body to massage a skin area of the user that fits the side wall of the in-vivo end 30; and alternatively, the first massage outlet 1 and the second massage outlet 4 are arranged at the in-vitro end 31 to massage an area of the user's body surface.

According to some examples of the present disclosure, optionally, as illustrated in FIGS. 1-4, an inner shell is further arranged inside the outer shell 3; the inner shell is harder than the outer shell 3; and the inner shell is fitted with the outer shell 3 and the inner shell supports the outer shell 3.

The inner shell is harder than the outer shell 3, such that the outer shell 3 is supported by the harder inner shell when deforming and fitting with the user's skin, to maintain an overall shape of the massager provided in the present disclosure, which enhances overall stability of the massager and optimizes user experience.

According to some examples of the present disclosure, optionally, as shown in FIG. 7, the inner shell is formed by splicing a first sub-shell and a second sub-shell; and the first sub-shell and the second sub-shell are detachably connected.

The first sub-shell and the second sub-shell are connected in a snap-fitted, magnetic, threaded or similar manner.

The split-type inner shell allows for step-by-step assembly of the outer shell 3 and the inner shell (e.g., the air control assembly 2 is first secured to the sub-shells of the inner shell, and then overall splicing is performed), which reduces the difficulty of mounting components inside complicated cavities. A single sub-shell damaged (e.g., cracked or deformed) is individually removed and replaced, thereby eliminating the need to discard the entire inner shell due to localized faults, and significantly reducing maintenance costs.

According to some examples of the present disclosure, optionally, as illustrated in FIGS. 3-6, the first massage outlet 1 and the second massage outlet 4 are communicated with the air control assembly 2 through hoses; the inner shell is provided with through holes for the hoses; and part of the outer shell 3 extends into the through hole and is fitted with an end of the hose.

The outer shell 3 extends into the through hole of the inner shell and is tightly fitted with an end of the hose, and a mechanically compressed sealing interface is formed, which prevents air leakage at a joint under high pressure or negative pressure conditions, thereby ensuring the efficiency of pressure transfer between the air control assembly 2 and the massage outlet. The end of the hose is secured through cooperation of the outer shell 3 and the through hole, and a dual-constraint design (limitation through the through hole of the inner shell+compression through the outer shell 3) effectively resists high-frequency vibrations of the massager during operation, and prevents functional failure caused by hose connection loosening.

According to some examples of the present disclosure, optionally, as illustrated in FIGS. 3-6, a power supply and a charging system are further arranged inside the outer shell 3; the power supply is electrically connected to the air control assembly 2, and the power supply is also electrically connected to the charging system; and a charging port of the charging system extends to the outer surface of the outer shell 3.

The charging system may include, but is not limited to, a printed circuit board assembly (PCBA).

The built-in power supply (such as a lithium battery) enables the massager provided in the present disclosure to operate without need of an external power supply, and the user is allowed to move the massager freely when using (applicable to scenarios such as homes, vehicles, or travel), thereby expanding the application scope. The charging port extends to a surface of the outer shell 3, and direct plug-in charging (through a Type-C interface) is supported, without need to disassemble the outer shell 3 or use specialized tools, thereby enhancing user convenience.

The present disclosure has been described with reference to preferred examples, but various modifications thereto may be made without departing from the scope of the present disclosure, and equivalents may be used to replace components therein. In particular, as long as there are no structural conflicts, various technical features mentioned in all examples may be combined in any manner. The present disclosure is not limited to specific examples disclosed herein but includes all technical solutions that fall within the scope of the claims.

What is claimed is:

1. A suction massage structure, comprising:
- a first massage outlet and a second massage outlet;
- the first massage outlet and the second massage outlet are configured to fit skin in a massage area;
- an air control assembly, being communicated with both the first massage outlet and the second massage outlet;
- the air control assembly configured to alternately blow or suck air against the skin in the massage area through the first massage outlet and the second massage outlet to apply a positive or negative pressure;
- the air control assembly is configured to apply an opposite air pressure on the skin in the massage area through the second massage outlet when a positive or negative pressure is applied to the skin in the massage area through the first massage outlet; and
- the first massage outlet and the second massage outlet are arranged coaxially along a central axis and share at least part of their side walls.

2. The suction massage structure according to claim 1, wherein the first massage outlet and the second massage outlet are alternately arranged from inside to outside circle by circle to form an annular structure.

3. The suction massage structure according to claim 2, wherein a range of a massage effect applied to the skin in the massage area by the first massage outlet and the second massage outlet gradually increases from inside to outside.

4. The suction massage structure according to claim 1, wherein the number of the first massage outlets is at least one, the number of the second massage outlets is at least one, and the first massage outlet and the second massage outlet are arrayed.

5. The suction massage structure according to claim 1, wherein a direction of an opening where the first massage outlet is communicated with the air control assembly is parallel to a direction of an opening of the first massage outlet; and
- a direction of an opening where the second massage outlet is communicated with the air control assembly is parallel to a direction of an opening of the second massage outlet.

6. The suction massage structure according to claim 1, wherein the air control assembly comprises:
- an air pump housing;
- a pushing member, being in sliding fit with an inner wall of the air pump housing;
- the pushing member divides an internal space of the air pump housing into two variable chambers;
- the variable chambers are communicated with the first massage outlet or the second massage outlet; and
- the pushing member is configured to move inside the air pump housing to alternately increase and decrease volumes of the two variable chambers.

7. The suction massage structure according to claim 6, wherein the two variable chambers are communicated with the first massage outlet and the second massage outlet through flexible hoses.

8. The suction massage structure according to claim 6, wherein the air control assembly further comprises an eccentric member and a drive member;
- the drive member is configured to drive the eccentric member to rotate;
- the pushing member is internally provided with a through hole for the eccentric member to penetrate through; and and when the eccentric member rotates, the pushing member is driven to move between ports where the two variable chambers are communicated with the first massage outlet or the second massage outlet in a reciprocating manner.

9. The suction massage structure according to claim 8, wherein a piston head is arranged at either of the two ends of the pushing member that face the two variable chambers; and the piston heads are fitted with the inner wall of the air pump housing.

10. The suction massage structure according to claim 9, wherein inside of the air pump housing is cylindrical; and the piston heads are fitted with an inner circumferential face of the air pump housing.

11. The suction massage structure according to claim 8, wherein an outer wall of the pushing member is fitted with at least two opposing inner wall faces of the air pump housing.

12. A massager, comprising:

the suction massage structure according to claim 1;

an outer shell;

the air control assembly is arranged inside the outer shell, and the first massage outlet and the second massage outlet are arranged outside the outer shell;

an outer surface of the outer shell comprises recessed grooves for accommodating the first massage outlet and the second massage outlet; and one end of either of the first massage outlet and the second massage outlet that is fitted with the skin in the massage area is flush with the outer surface of the outer shell.

13. The massager according to claim 12, wherein the outer shell comprises an in-vivo end and an in-vitro end;

the first massage outlet and the second massage outlet are arranged on a side wall of the in-vivo end; and alternatively, the first massage outlet and the second massage outlet are arranged at the in-vitro end.

14. The massager according to claim 12, wherein an inner shell is further arranged inside the outer shell;

the inner shell is harder than the outer shell; and the inner shell is fitted with the outer shell and the inner shell supports the outer shell.

15. The massager according to claim 14, wherein the inner shell is formed by splicing a first sub-shell and a second sub-shell; and the first sub-shell and the second sub-shell are detachably connected.

16. The massager according to claim 14, wherein the first massage outlet and the second massage outlet are communicated with the air control assembly through hoses;

the inner shell is provided with through holes for the hoses; and part of the outer shell extends into the through hole and is fitted with an end of the hose.

17. The massager according to claim 12, wherein a power supply and a charging system are further arranged inside the outer shell;

the power supply is electrically connected to the air control assembly, and the power supply is also electrically connected to the charging system; and a charging port of the charging system extends to the outer surface of the outer shell.

* * * * *